United States Patent [19]

Decker et al.

[11] Patent Number: 5,357,342

[45] Date of Patent: Oct. 18, 1994

[54] PROCESS AND APPARATUS FOR MEASURING DEGREE OF POLARIZATION AND ANGLE OF MAJOR AXIS OF POLARIZED BEAM OF LIGHT

[75] Inventors: Derek E. Decker, Carmel; John S. Toeppen, Livermore, both of Calif.

[73] Assignee: The United States of America as represented by the United States Department of Energy, Washington, D.C.

[21] Appl. No.: 996,935

[22] Filed: Dec. 30, 1992

[51] Int. Cl.$^5$ .............................................. G01B 9/02
[52] U.S. Cl. ................................................... 356/364
[58] Field of Search ....................... 356/364, 366, 367; 250/225

[56] References Cited

U.S. PATENT DOCUMENTS 2,731,875 12/1952 Gould .................................. 356/367
5,005,977 4/1991 Tomoff ................................ 356/367

Primary Examiner—Richard A. Rosenberger
Assistant Examiner—Russell C. Wolfe
Attorney, Agent, or Firm—Miguel A. Valdes; Roger S. Gaither; William R. Moser

[57] ABSTRACT

Apparatus and process are disclosed for calibrating measurements of the phase of the polarization of a polarized beam and the angle of the polarized optical beam's major axis of polarization at a diagnostic point with measurements of the same parameters at a point of interest along the polarized beam path prior to the diagnostic point. The process is carried out by measuring the phase angle of the polarization of the beam and angle of the major axis at the point of interest, using a rotatable polarizer and a detector, and then measuring these parameters again at a diagnostic point where a compensation apparatus, including a partial polarizer, which may comprise a stack of glass plates, is disposed normal to the beam path between a rotatable polarizer and a detector. The partial polarizer is then rotated both normal to the beam path and around the axis of the beam path until the detected phase of the beam polarization equals the phase measured at the point of interest. The rotatable polarizer at the diagnostic point may then be rotated manually to determine the angle of the major axis of the beam and this is compared with the measured angle of the major axis of the beam at the point of interest during calibration. Thereafter, changes in the polarization phase, and in the angle of the major axis, at the point of interest can be monitored by measuring the changes in these same parameters at the diagnostic point.

10 Claims, 3 Drawing Sheets

PROCESS AND APPARATUS FOR MEASURING DEGREE OF POLARIZATION AND ANGLE OF MAJOR AXIS OF POLARIZED BEAM OF LIGHT

BACKGROUND OF THE INVENTION

The invention described herein arose in the course of, or under, Contract No. W-7405-ENG-48 between the United States Department of Energy and the University of California.

This invention relates to a process and apparatus for measuring the degree of polarization of a beam of polarized light and the angle of the major axis of the polarized beam. More particularly, this invention relates to a process and an apparatus for measuring such optical polarization properties of an optical point at a first point along an optical path and then adjusting compensating optics at a second point on the optical path to obtain identical optical measurements at this point.

When a beam of polarized light, such as a laser beam, is passed through various optics, such as lenses and mirrors, it is often desirable to analyze the light beam at a particular point in the optics system. Such an analysis would include the phase or degree of polarization of the light beam as well as the angle of the major axis of the elliptically polarized optical beam, when the polarization is not circular. This angle is measured with respect to a fixed frame of reference, such as a polar axis in the cross-section of the beam itself.

However, it is not always possible to do a complete analysis of the beam at a particular point in the optics system, i.e., the point of-interest, due, for example, to space constraints or because of the beam power at the point of interest. But if the beam is, instead, analyzed at a later point along the beam path, the phase or degree of polarization and the angle of the major axis of the beam may have become corrupted by the optics disposed along the beam path between the point of interest and the actual measurement point. That is, the actual measurements made on the beam at a different point may not be accurately reflective of the status of the beam at the point of interest.

It would, therefore, be desirable to provide a process and an apparatus for carrying out such measurements which would include provision for correcting or calibrating for such changes in the polarization of the beam which occur between the point of interest and the actual measurement point.

SUMMARY OF THE INVENTION

The invention comprises a process and an apparatus for calibrating measurements of the phase of the polarization of a polarized beam and the angle of the polarized optical beam's major axis of polarization at a diagnostic point with measurements of the same parameters at a point of interest along the polarized beam path prior to the diagnostic point. The process is carried out by measuring the phase angle of the polarization of the beam and angle of the major axis at the point of interest, using a rotatable polarizer and a detector, and then measuring these parameters again at a diagnostic point where a compensation apparatus, comprising a partial polarizer which may, for example, comprise a stack of glass plates, is disposed normal to the beam path, either between a second rotatable polarizer and a second detector or before both the second rotatable polarizer and second detector. The partial polarizer is then rotated both normal to the beam path and around the axis of the beam path until the detected phase of the beam polarization equals the phase measured at the point of interest. The rotatable polarizer at the diagnostic point may then be rotated manually to determine the angle of the major axis of the beam and this is compared with the measured angle of the major axis of the beam at the point of interest. Thereafter, changes in the polarization phase, and in the angle of the major axis, at the point of interest can be monitored by measuring the changes in these same parameters at the diagnostic point.

DETAILED DESCRIPTION OF THE INVENTION

Figure 1:
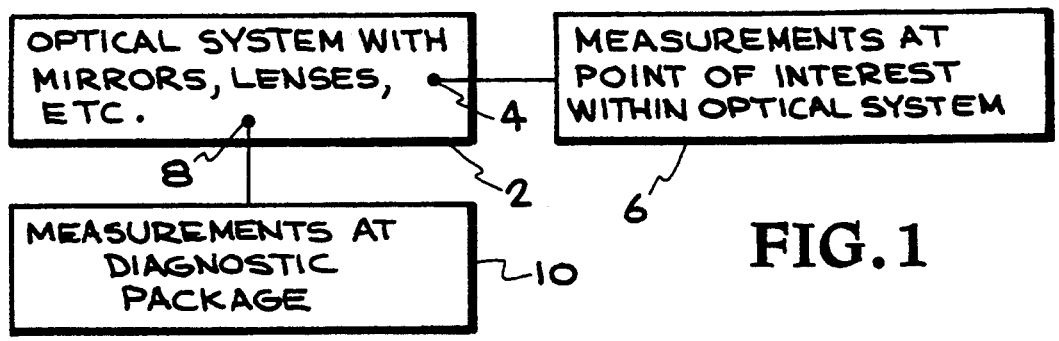
FIG. 1 is a flow diagram showing the general relationship between the point of interest and the diagnostic point with respect to different positions in the general optical system through which the optical beam is traveling.

Turning now to FIG. 1, an optical system suitable for carrying out the process of the invention is represented at 2 having a particular point 4 along the optical path in system 2 at which it is desired to monitor certain optical characteristics of the beam, namely the phase or degree of polarization of the beam and the angle of the major axis of the ellipticity of the polarized beam with respect to some reference frame. These characteristics of the beam are initially measured at point 4 along the beam path, hereinafter referred to as the point of interest, using optical measuring apparatus 6, while the beam is at low power. The measured results are then compared with results obtained by taking the same measurements at another point 8 along the optical path, hereinafter referred to as the diagnostic point, using optical measuring apparatus 10. Measurements may be made at point 8 at any time during operation of the beam, .i.e., whether the beam is being operated at high power or low power, due to the fact that only a portion of the beam is analyzed at diagnostic point 8, due to the use of appropriate beam splitting apparatus, such as, for example, a mirror with a small percent of transmission.

Polarization will be assumed to be composed of two perpendicular electric field components with a phase shift between them. A zero phase shift yields linear polarization and a ninety degree phase shift yields circular polarization. Elliptical polarization exists between these extremes and the phase shift is, therefore, between zero and ninety degrees (either plus ninety degrees or minus ninety degrees, depending upon whether the rotation is clockwise—right circular polarization, or counterclockwise rotation—left circular polarization) and the degree or amount of ellipticity of the polarization of the beam between these two extremes is one of the parameters measured at the point of interest and compensated for at the diagnostic point.

Thus, after such calibration of the parameters of the optical beam measured at point of interest 4 with the parameters of the beam measured at diagnostic point 8, changes in the parameters of the beam at point of interest 4 may be monitored, even when the optical beam is at high power, by measuring the parameters of the beam at diagnostic point 8. That is, the changes in the optical parameters of the beam at point of interest 4, should be ascertainable from the measured changes in the optical parameters of the beam at diagnostic point 8.

Figure 2:
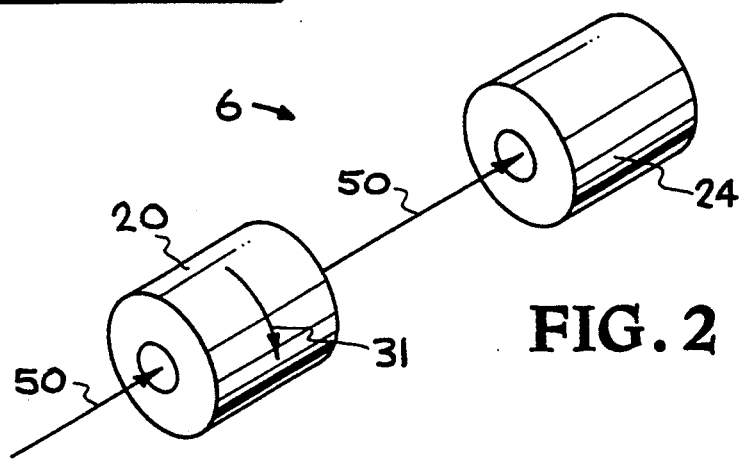
FIG. 2 illustrates the means for measuring both the phase angle of the polarization and the angle of the long axis of the ellipse of the beam at the point of interest.

Turning now to FIG. 2, apparatus 6 for measuring the phase or degree of polarization of the polarized optical beam depicted at numeral 50, as well as for determining the angle of the major axis of the ellipticity of the beam is generally shown comprising a polarizer 20 and a photodetector 24. To first determine the phase or degree of polarization of the optical beam at point of interest 4, a low power beam is passed through optical system 2 and polarizer 20 is rotated at a slow, but constant, rate while the transmission of the optical beam through the polarizer is monitored via photodetector 24. The output of photodetector 24 may be connected to an electrical meter, to a strip chart recorder, or to a device capable of visually displaying the oscillations of the beam intensity, e.g., an oscilloscope, as the polarizer rotates.

If photodetector 24 shows a variance from complete transmission of the optical beam through polarizer 20 to complete extinction of the beam, the polarization is linear. On the other hand, should there be no discernable variation in the transmission of the optical beam through the polarizer as it rotates, the polarization will be circular.

In the more likely event that photodetector 24 shows a variation or oscillation from something higher than complete extinction to something less than full transmission, the polarization is elliptical, and its phase can be determined from the amount or degree of change from minimum to maximum transmission. By dividing the maximum power by the minimum, the extinction ratio can be determined which, in turn, determines the amount or phase of the polarization, i.e., the ellipticity. Linear polarized light has an extremely high extinction ratio, while circularly polarized light will have the minimum extinction ratio of unity.

After this determination is made of the amount of phase shift or degree of polarization of the optical beam (ellipticity) at point of interest 4, the angle of the major axis of the elliptically polarized beam may be determined by shutting off the continuous rotation of polarizer 20 and instead manually rotating polarizer 20 while monitoring photodetector 24 for a maximum transmission of the optical beam, indicative that the polarizer axis (the axis at which maximum transmission occurs) is aligned with the major axis of the elliptically polarized beam.

If polarizer 20 has been previously calibrated with a linear polarized beam, the angle of rotation of the major axis of the elliptical beam, for example, from the Y axis (where the Y axis equals the axis of maximum transmission of a completely linear beam) can be determined by the amount by which polarizer 20 must be rotated from such a previous alignment with the Y axis of the linear beam.

After these measurements have been made at point of interest 4 by measurement apparatus 6 comprising polarizer 20 and photodetector 24, the same parameters are measured at diagnostic point 8. In the unlikely event that the exact same phase or degree of polarization of the optical beam is measured at this point, and the angle of the major axis of the elliptical beam with respect to the same axis (X or Y) is identical to that measured at point of interest 4, the polarization of the optical beam from point of interest 4 to diagnostic point 8 has either not changed or any polarization changes have cancelled one another out.

However, what will probably occur is that the measured polarization phase at diagnostic point 8 and the measured angle of the major axis of the elliptical beam will both have been changed by the optics and materials in the optical path through which the optical beam traverses between point of interest 4 and diagnostic point 8. Therefore, in accordance with the invention, corrections must be made and measured to calibrate the measurements at diagnostic point 8 with those taken at point of interest 4 so that future changes in the optical polarization of the beam, when the beam is at different powers, can be measured at diagnostic point 8 and from those measurements the changes in the polarization of the optical beam at point of interest 4 can be determined.

Figure 3:
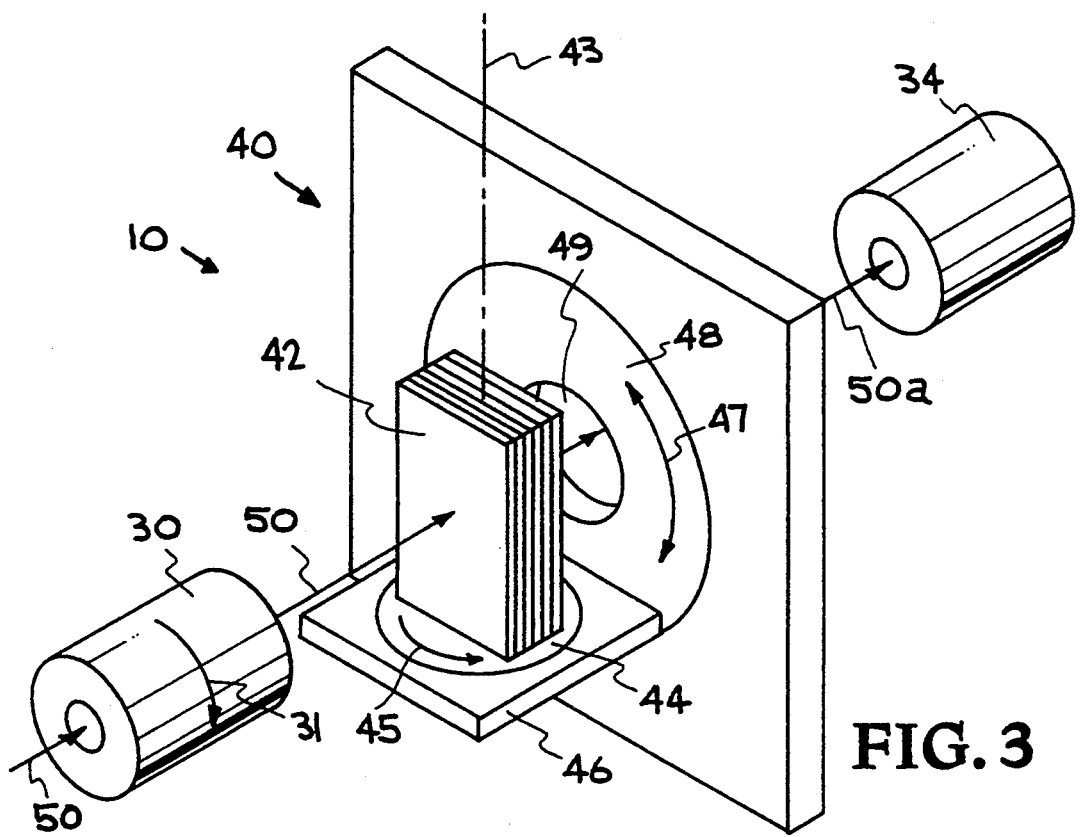
FIG. 3 illustrates the compensating means for measuring both the phase angle of the polarization and the angle of the long axis of the ellipse of the beam at the diagnostic point for a single wavelength, showing the partial polarizer disposed along the beam path and the means for rotating the partial polarizer along two different axes.

Referring now to FIG. 3, apparatus is shown, representing (in a simplified form for a single wavelength) apparatus 10 of FIG. 1, which is used in accordance with the invention to both measure the polarization phase and the angle of the major axis of the elliptical beam, and to calibrate these measurements to the same measurements made earlier on the optical beam at point of interest 4 with apparatus 6.

Optical measurement apparatus 10, therefore, also includes a polarizer 30 which is rotatable, as shown at arrow 31 in FIG. 3, and a photodetector 34 which will detect and then display and/or record the minimum and maximum light transmission of optical beam through rotating polarizer 30. However, in addition, measurement apparatus 10 further comprises calibration or compensation apparatus 40.

Compensation apparatus 40, in one embodiment, basically comprises a polarizer 42 of the glass plate stack type normally used to separate S and P type polarized light into S and P beams, wherein the S beam is reflected and the P beam is completely transmitted at Brewster's Angle, and sometimes referred to as a "pile of plates polarizer". However, in this application, polarizer 42 is used as a partial polarizer which is rotatable around an axis normal to the beam path and also around the axis of the beam path to thereby tune the P beam output of partial polarizer 42 detected by detector 34 to match the polarized beam output of polarizer 20 which is detected by detector 24 of apparatus 6. (The reflected S beam from partial polarizer 42 is reflected away to an absorber which extinguishes it.) To provide a degree of polarization of about 97% (where the angle of incidence is Brewster's angle), for example, glass plate stack type polarizer 42 may comprise a stack of about 190 glass plates, each having a refractive index of about 1.5 and a thickness of about 0.1 millimeters.

Partial polarizer 42 is mounted to a platform 44 capable of rotating polarizer 42, as shown by arrow 45, around axis 43 which, as shown in FIG. 3, is normal to the axis of optical beam 50. Platform 44 is, in turn, rotatably mounted to a base 46 which is attached to a rotatable stage 48 which may be rotated, as shown by arrow 47, in either direction around the axis of optical beam 50a emerging from partial polarizer 42. Rotatable stage 48 is provided with a large central opening 49 through which beam 50a passes as it travels to detector 34.

It should be noted at this point that the use of a "pile of plates polarizer" type polarizer as the partial polarizer is not mandatory. Other types of partial polarizers may be used such as, for example, multiple layers of dielectric films on a single glass substrate. Such a partial polarizer may, however, be more frequency sensitive than the "pile of plates polarizer" type polarizer and might, therefore, be more useful in the embodiment of FIG. 6 to be described below.

Figure 4:
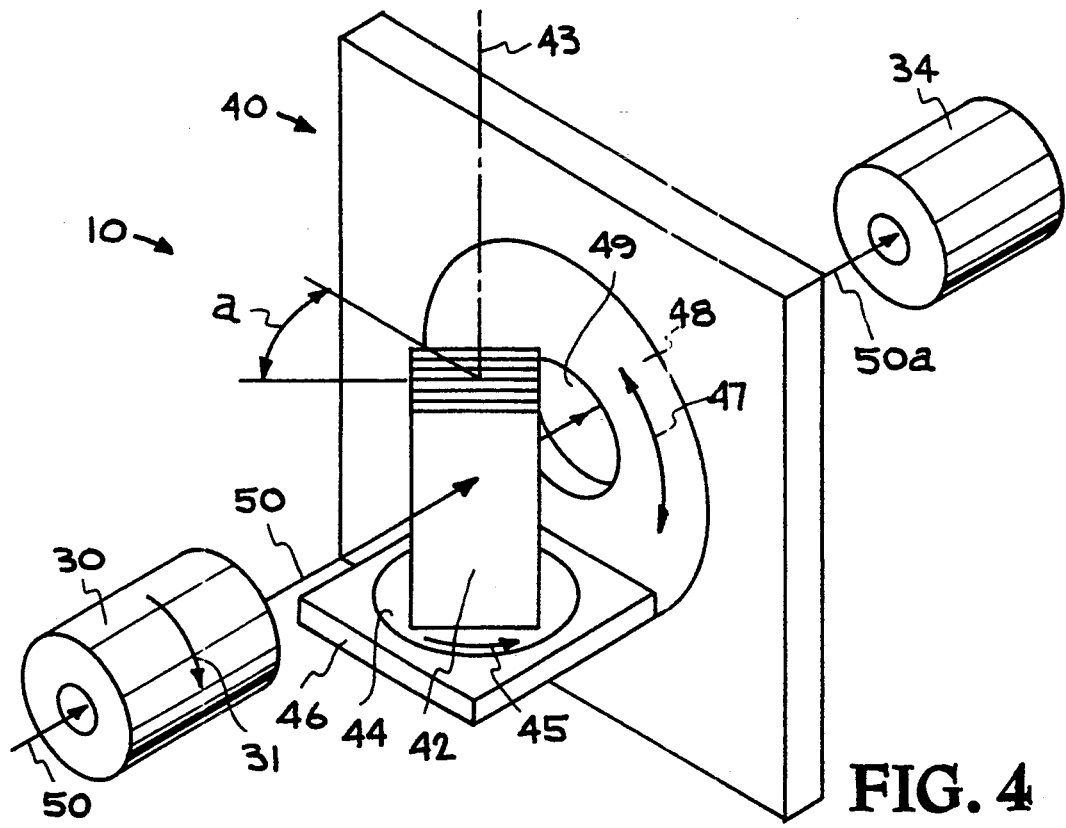
FIG. 4 shows the partial polarizer partially rotated, with respect to FIG. 3, along an axis normal to the beam path and lying in the plane of the center plate of the partial polarizer.

To measure the ellipticity of the optical beam as it passes through apparatus 10 and to calibrate the optics comprising apparatus 10 to obtain the same ellipticity measurement at detector 34 as previously measured at detector 24 (representing the ellipticity of the beam at point of interest 4), partial polarizer 42 may be first rotated or tipped, as shown in FIG. 4, by rotating base 44 on axis 43 (the axis normal to the axis of beam 50) so that the normal of the plane of partial polarizer 42 has an angle a, with respect to beam 50, which is about one third of Brewster's angle (i.e., about one third of the angle at which partial polarizer 42 becomes a complete polarizer).

Figure 5:
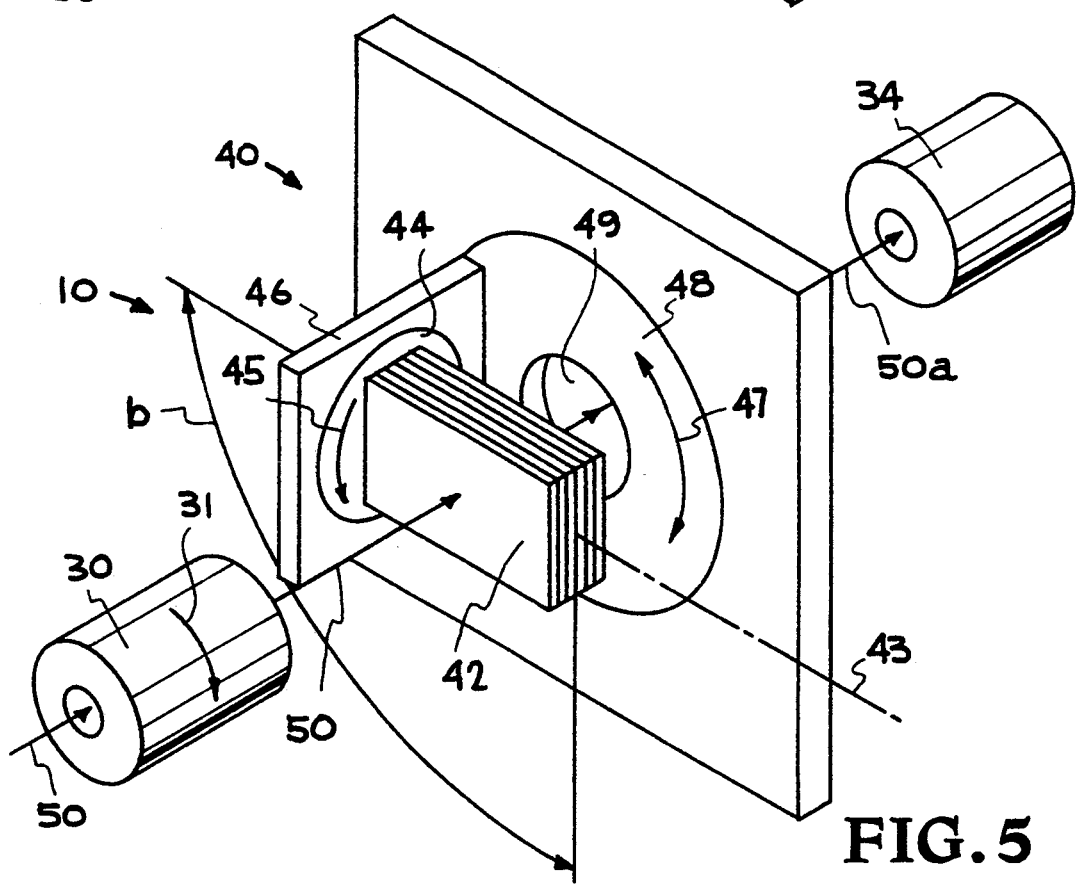
FIG. 5 shows the partial polarizer partially rotated, with respect to FIG. 3, around the beam axis.

Stage 48 is then rotated, as shown in FIG. 5, to rotate partial polarizer 42 with respect to beam 50, i.e., to thereby rotate polarizer 42 in either direction around the axis of beam 50 at an angle b, which may vary from 0° to 360°, to adjust the phase of the ripple. This rotation of polarizer 42 will either increase or decrease the degree of ellipticity, i.e., improve the extinction ratio or make it worse. The amount of rotation which improves the extinction ratio, i.e., makes it closer to the reference signal (at detector 24) is selected and this position of stage 48 is then locked in place.

Partial polarizer 42 is then again rotated or tipped around axis 43 (the axis normal to beam path 50) until the extinction ratio is exactly the same as the reference signal (at detector 24). This rotation angle of partial polarizer is then also locked in place.

Thus, when the phase and size of the ripple, i.e., the elliptical trace shown on an oscilloscope matches the signal detected by detector 24 of apparatus 6, the adjustment to compensation apparatus 40 of apparatus 10 to calibrate apparatus 10 with respect to apparatus 6 has been accomplished.

To complete the calibration, the rotation of polarizer 30 of apparatus 10 is shut off and polarizer 30 may be hand rotated to a position where optical beam 50 has maximum transmission through polarizer 30, indicative that the axis of the polarizer is aligned with the major axis of the elliptically polarized beam. This rotational position of polarizer 30 is then noted (for comparison with future measurements indicative of a change in the angle of the major axis of the elliptical beam at point of interest 4).

Alternatively, the angle of the major axis of the elliptical beam could be aligned with the angle of the major axis of the elliptical beam as displayed at detector 24, by adjustment of compensation apparatus 40 when apparatus 40 is initially adjusted to correspond to provide a signal at detector 34 having the same ellipticity as the signal at detector 24.

At this point, the measurements taken (at both points 4 and 8) may be compared to standards to determine the extent of the degree or phase of the polarization of the beam and to determine the angle of the major axis of the elliptical beam. However, the position of the calibration equipment 40 at this point can be merely noted for future reference. That is, when it is desired in the future to again determine the optical characteristics of the beam at point of interest 4, by only measuring the beam at diagnostic point 8, for example, with the beam at a different power, or with the optical media changed from the previous calibration measurements, the change in the phase of the polarization at point of interest 4, as well as the angle of the major axis of the elliptical beam may be determined by comparing the readings or measurements at that time with the previous measurements to thereby determine the changes from the prior measurements.

Thus, by calibrating compensation apparatus 40 to provide a matching output at detector 34 to the output of detector 24, future determination of the phase or degree of the polarization of the polarized beam at point of interest 4 may be made by measuring the characteristics of the beam at diagnostic point 8, as corrected by compensation apparatus 40, i.e., by measuring the polarization characteristics of the beam after passing it through partial polarizer 42 in apparatus 40.

Figure 6:
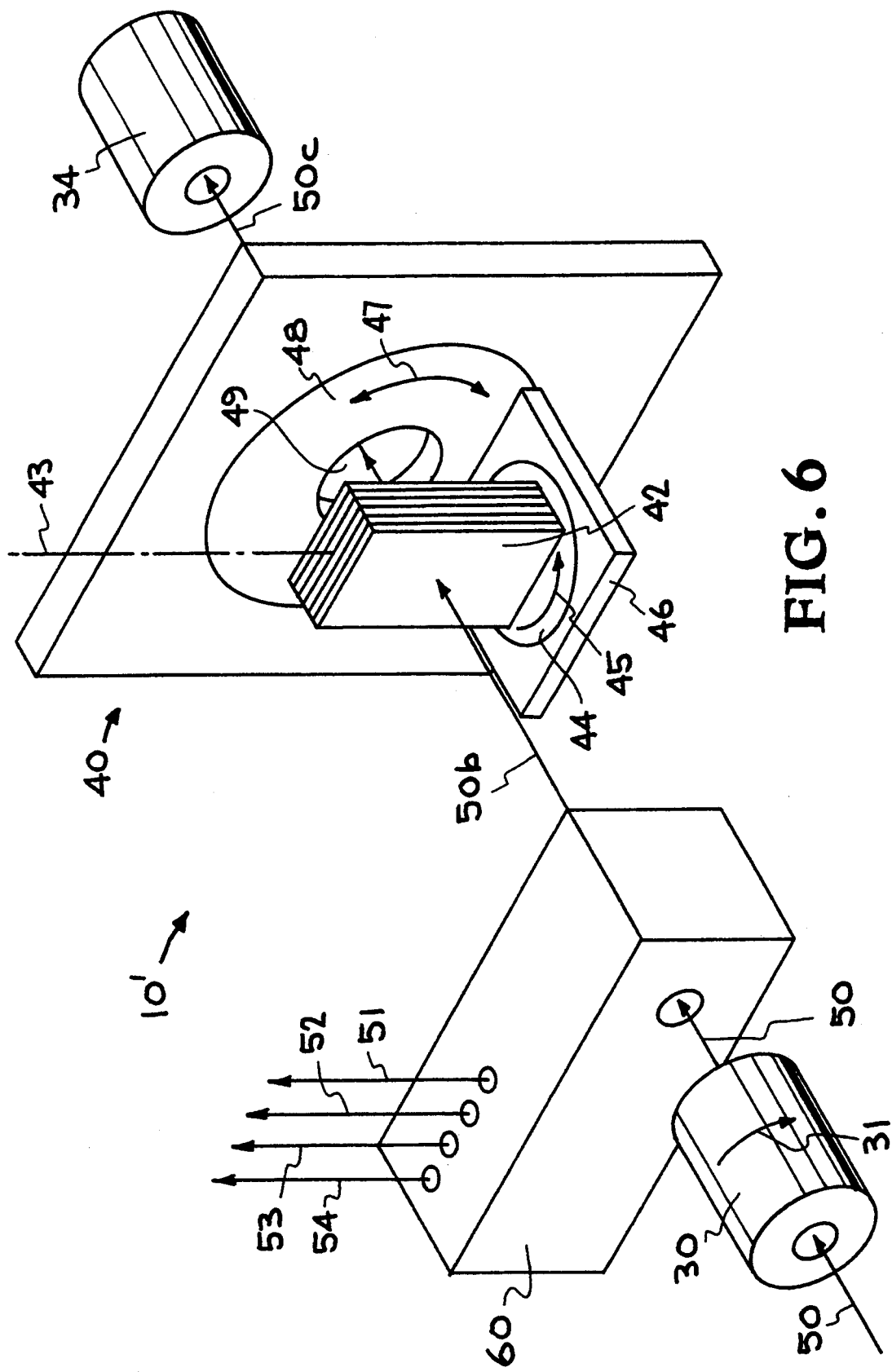
FIG. 6 shows the compensating means for measuring both the phase angle of the polarization and the angle of the long axis of the ellipse of the beam at the diagnostic point as shown in FIG. 3, except that a beam splitter has been placed in the beam path when a partial polarizer responsive to a particular wavelength is used for the measurement and calibration of each wavelength in the beam.

Turning now to FIG. 6, apparatus 10' is illustrated which differs from the previously described apparatus 10 of FIGS. 3-5 in that apparatus 10' permits the previously described measurements and calibrations to be carried out at a number of optical frequencies (or wavelengths) when the beam does not consist of merely one frequency. In this embodiment, beam splitting apparatus 60 is interposed in the path of beam 50 after rotating polarizer 30 and prior to compensation apparatus 40 to split the multifrequency beam into its components parts (50b and 51-54).

This embodiment is preferred when a multifrequency beam is to be measured and when the particular type of partial polarizer 42 being used is not broadband in its response, e.g., where a multiple dielectric film partial polarizer is being used. In such a case, in accordance with this embodiment, for each compensation apparatus 40, a separate partial polarizer 42 will be employed and separately tuned for each frequency to compensate for the optical changes at that frequency from point of interest 4 to diagnostic point 8.

It should also be noted, in this regard, that while rotatable polarizer 30 is shown in the path of beam 50 prior to beam splitting optics 60, a separate polarizer 30 could be placed in the optical path of single frequency beam 50b emerging from optical splitting apparatus 60 and prior to compensation apparatus 40 from which beam 50c emerges for detection by detector 34. However, this would require the use of separate rotating polarizers 30 for each wavelength, resulting in additional costs and complexity. Therefore, since polarizer 30 is broadband in its response, the placement of a single rotating polarizer 30 upstream of beam splitting optics 60 is preferred from an economical standpoint.

Thus, the invention provides an apparatus and process for the calibration and compensation of the optical polarization properties of an optical beam at a diagnostic point in the optical path of the beam to match the previously measured optical polarization properties of the optical beam at a different point (point of interest) along the optical path, so that changes in the optical polarization properties of the beam at this point of interest can be subsequently monitored and determined by subsequent measurements of the optical properties of the beam at the diagnostic point and then comparing such subsequent measurements with the earlier measurements at the diagnostic point to thereby determine the changes in the optical polarization properties which have occurred at the point of interest.

While specific embodiments of the optical polarization measurement and compensation apparatus and process have been illustrated and described for operating the apparatus and carrying out the process in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. A process for calibrating the measurement of the phase angle and major axis of the polarization of a polarized beam at a diagnostic point with a measurement of the same parameter at a point of interest along the polarized beam path prior to the diagnostic point which comprises:
   a) measuring the phase angle of the polarization of the beam and angle of the major axis at said point of interest, using a first rotatable polarizer and a first detector;
   b) then measuring these parameters again at a diagnostic point using a second rotatable polarizer and a second detector;
   c) disposing a compensation apparatus, including a tunable partial polarizer, along the beam path leading to said second detector; and
   d) adjusting said tunable partial polarizer both by rotating said tunable partial polarizer around an axis normal to the beam path and also rotating said tunable partial polarizer around the axis of the beam path until the detected phase of the beam polarization at said second detector equals the phase measured at the point of interest;
to thereby compensate for any differences between the phase angle measured at said point of interest and the phase angle measured at said diagnostic point.

2. The process of claim 1 wherein said step of disposing a compensation apparatus, including a partial polarizer, along the beam path further comprises disposing a partial polarizer comprising a stack of glass plates along said beam path.

3. The process of claim 1 wherein said step of disposing said partial polarizer along said beam path leading to said second detector further includes disposing said partial polarizer along said beam path between said second rotatable polarizer and said second detector.

4. The process of claim 1 wherein said step of disposing said partial polarizer along said beam path leading to said second detector further includes disposing said partial polarizer along said beam path prior to said second rotatable polarizer and said second detector.

5. The process of claim 1 including the further step of passing said beam through a beam splitter capable of splitting a multiple frequency beam into its component parts prior to passing said beam through said compensation apparatus, whereby the phase angle of the polarization of one or more single frequencies may be independently measured.

6. The process of claim 5 wherein said process further includes the step of passing said one or more single frequency beams through a tunable partial polarizer comprising multiple dielectric films on a substrate.

7. The process of claim 1 wherein said process for calibrating the measurement of said major axis of the polarization of said polarized beam at a diagnostic point with a measurement of said major axis at a point of interest along the polarized beam path further includes the steps of:
   a) determining the angle of the major axis of said beam, at said point of interest, when the polarization of said beam is elliptical, with respect to a reference axis, by rotating said first rotatable polarizer until maximum optical transmission through said first rotatable polarizer is achieved, signifying alignment of the axis of transmission of said first rotatable polarizer with said major axis of said beam having an elliptical polarization; and
   b) determining the angle of the major axis of said beam, at said diagnostic point, when the polarization of said beam is elliptical, with respect to a reference axis, by rotating said second rotatable polarizer until maximum optical transmission through said second rotatable polarizer is achieved, signifying alignment of the axis of transmission of said second rotatable polarizer with said major axis of said beam having an elliptical polarization;
whereby a change in said angle of the major axis of said beam having an elliptical polarization, at said point of interest can be monitored by measuring the change in said angle at said diagnostic point and comparing such measured change with the original measurement of said angle.

8. Apparatus for calibrating the measurement of the phase of the polarization of a polarized beam, and the major axis of the polarized beam, at a diagnostic point with a measurement of the same parameter at a point of interest along the polarized beam path prior to the diagnostic point which comprises:
   a) means for measuring the phase angle of the polarization of the beam and angle of the major axis at the point of interest, comprising a first rotatable polarizer and a first detector;
   b) means for measuring these parameters again at a diagnostic point comprising a second rotatable polarizer and a second detector;
   c) a compensation apparatus, including a tunable partial polarizer, disposed along the beam path between said second rotatable polarizer and said second detector; and
   d) means for rotating said tunable partial polarizer both around an axis normal to the beam path and around the axis of the beam path until the detected phase of the beam polarization at said second detector equals the phase measured at the point of interest.

9. The apparatus of claim 8 wherein said partial polarizer comprises a stack of glass plates.

10. The apparatus of claim 8 wherein said partial polarizer comprises multiple dielectric films on a substrate.

* * * * *